US 6,600,919 B1

United States Patent
Kawase (10) Patent No.: US 6,600,919 B1
(45) Date of Patent: Jul. 29, 2003

(54) CELLULAR PHONE FOR RADIO COMMUNICATION SYSTEM HAVING AUTOMATIC DATA CONVERSION FUNCTION

(75) Inventor: Yoshiyuki Kawase, Anjo (JP)

(73) Assignee: Denso Corporation, Kariya (JP)

( * ) Notice: Subject to any disclaimer, the term of this patent is extended or adjusted under 35 U.S.C. 154(b) by 460 days.

(21) Appl. No.: 09/615,667

(22) Filed: Jul. 14, 2000

(30) Foreign Application Priority Data

Jul. 22, 1999 (JP) ............................................ 11-207597

(51) Int. Cl.$^7$ ........................... H04M 3/42; H04M 3/00; H04M 1/00; H03B 1/38
(52) U.S. Cl. ....................... 455/414; 455/418; 455/566; 455/435
(58) Field of Search .................. 455/403, 405, 455/406, 407, 411, 412, 414, 415, 418, 422, 432, 435, 440, 550, 556–558, 566

(56) References Cited

U.S. PATENT DOCUMENTS

| 5,903,824 | A | * | 5/1999 | Ruhl et al. | ............... | 455/186.1 |
| 6,047,196 | A | * | 4/2000 | Makela et al. | ............... | 455/556 |
| 6,206,283 | B1 | * | 3/2001 | Bansal et al. | ............... | 235/379 |
| 6,226,500 | B1 | | 5/2001 | Nonami | | |
| 6,308,087 | B1 | * | 10/2001 | Aoshima | .................... | 455/575 |

FOREIGN PATENT DOCUMENTS

| JP | 07079194 | 3/1995 |
| JP | 7-085060 | 3/1995 |
| JP | 9107452 | 4/1997 |
| JP | 09205475 | 8/1997 |
| JP | 10084435 | 3/1998 |
| JP | 11032111 | 2/1999 |

OTHER PUBLICATIONS

Ground of Rejection, Dated Mar. 26, 2002 in JP Application No. 11-207597.

* cited by examiner

*Primary Examiner*—Nguyen T. Vo
*Assistant Examiner*—Edan Orgad
(74) *Attorney, Agent, or Firm*—Harness, Dickey & Pierce, PLC (57) ABSTRACT

A cellular phone is programmed to convert language and currency of a home country into corresponding language and currency of another country. When the cellular phone is used in the country in which the same communication protocol as that in the home country and the international roaming are available, the cellular phone determines from a received county ID code where it is used. It automatically performs various conversions such as language conversion and currency conversion with reference to a stored language dictionary and a retrieved currency exchange rate, respectively. Thus, travelers are enabled to use the cellular phone to communicate in different languages and shop in different currencies without any language or currency barrier.

4 Claims, 6 Drawing Sheets

CELLULAR PHONE FOR RADIO COMMUNICATION SYSTEM HAVING AUTOMATIC DATA CONVERSION FUNCTION

CROSS REFERENCE TO RELATED APPLICATION

This application relates to and incorporates herein by reference Japanese Patent Application No. 11-207597 filed on Jul. 22, 1999.

BACKGROUND OF THE INVENTION

The present invention relates to a cellular phone for use in a radio communication system capable of radio communication among a plurality of countries through roaming.

As one of communication protocols for cellular phones, "cdmaOne (registered trademark)" is adopted in Japan, the United States of America, Canada, Korea, China, etc. In the near future, international roaming is scheduled to be provided for the cellular phones among these counties. Under this radio communication system, users of the cellular phones will be enabled to use them in other countries, when they make an overseas travel from Japan to the United States of America.

Overseas travelers are required to use different languages, currencies and the like of other countries where they travel. The overseas travelers may use electronic language translation devices to overcome language barrier. However, the travelers must change the setting of the translation device to produce a corresponding language or use a different translation device in a different country.

SUMMARY OF THE INVENTION

It is therefore an object of the present invention to provide a cellular phone which is usable in other countries for automatically converting various data.

According to the present invention, a cellular phone is programmed to automatically convert language or currency of a home country into corresponding language or currency of different countries. When the cellular phone is used in the country in which the same communication protocol as that in the home country and the international roaming are available, the cellular phone determines from a received county ID code where it is used. It automatically performs various conversions such as language conversion or currency conversion with reference to a stored language dictionary or a retrieved currency exchange rate, respectively. Thus, travelers are enabled to use the cellular phone to communicate in different languages or shop in different currencies without any barrier.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
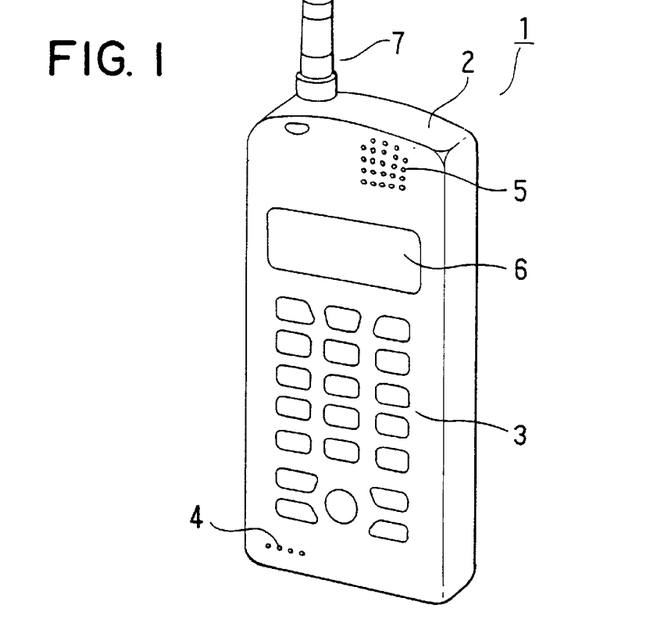
FIG. 1 is a perspective view showing a cellular phone used in a radio communication system according to the present invention.

Referring first to FIG. 1, a cellular phone used in a radio communication system is designated with reference numeral 1. The cellular phone 1 comprises a casing 2, a key operation unit 3, a microphone 4, a speaker 5, a display unit 6 for displaying phone numbers and the like, an antenna 7 and the like. The key unit 3 is provided on the front surface of the casing 2, and includes a plurality of keys or buttons such as a "start" key, an "end" key, numeric keys ("0" to "9"), a scroll key and the like.

Figure 2:
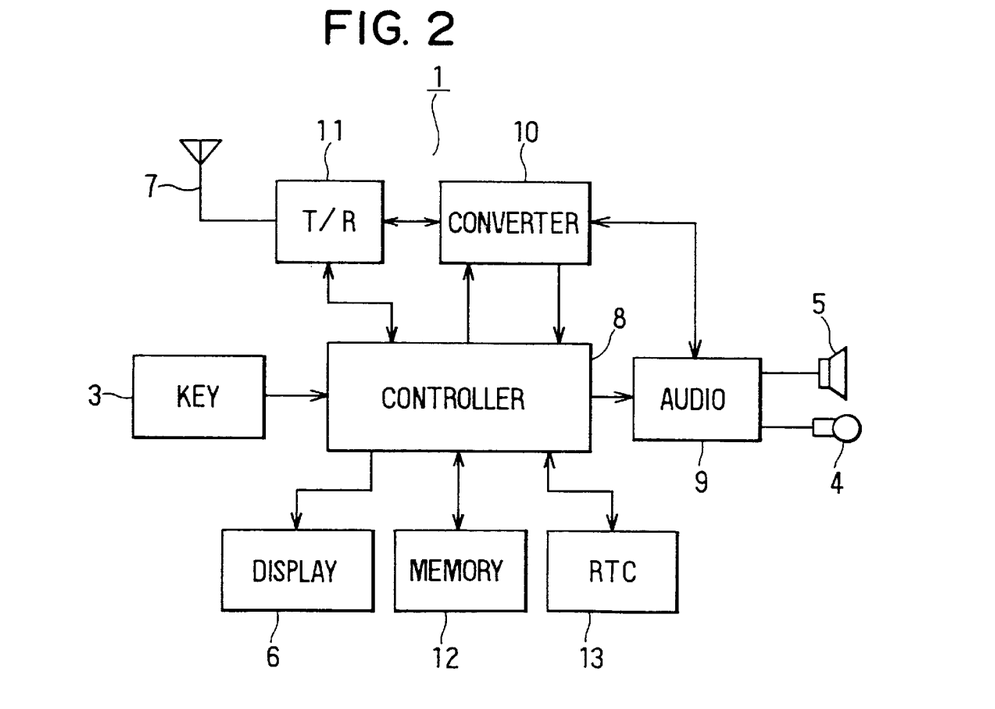
FIG. 2 is a block diagram showing an electric circuit construction of the cellular phone shown in FIG. 1.

The cellular phone 1 also includes electronic circuit unit therein as shown in FIG. 2. The circuit unit includes a controller 8 such as a microcomputer, an audio signal processor 9, a data converter 10, a radio signal transmitter/receiver 11, a memory 12 and a real time clock (RTC) 13. The controller 8 is constructed to receive key manipulation signals from the key unit 3 and to control the mode of display of the display unit 6 in response to the key manipulation signals. The controller 8 is also constructed to control operations of the audio signal processor 9, the data converter 10 and the radio signal transmitter/receiver 11 in response to the key manipulation signals.

When the audio signal processor 9 receives voice signals from the microphone 4, it A/D-converts the voice signals from the analog form to the digital form. The data converter 10 converts the digital signal to, for instance, π/4 shift DQPSK (Differential Quadrature Phase Shift Keying) signals. The radio signal transmitter/receiver 11 modulates the DQPSk signals by a carrier wave signal of 800 MHz band. The antenna 7 transmits the modulated signals as outgoing radio signals.

When the antenna 7 receives incoming radio signals, the radio signal transmitter/receiver 11 and the data converter 10 demodulate the received radio signals. The audio signal processor 9 D/A-converts the demodulated signals from the digital form to the analog form, and drives the speaker 5 to produce audio sounds. The radio signal transmitter/receiver 11 supplies the controller 8 with various signals indicative of reception of the incoming radio signals, signal levels of the transmitted or received radio signals.

The memory unit 12 includes ROMs, RAMS, EEPROMs and the like, and is connected to the controller 8. It receives various data from the controller 8 and stores the same therein, and supplies various stored data to the controller 8.

The memory unit 12 specifically stores therein control programs which define various processing operations of the controller 8.

The data converter 10 and the radio signal transmitter/receiver 11 are also constructed to have an electronic mailing function by which character messages are transmitted and received. In transmitting the mail, the user of the cellular phone 1 inputs a series of character data by manipulating the keys of the key unit 3 while checking the input data displayed on the display unit 6.

The input mail data is transmitted together with the phone number of the mail addressee through the data converter 10, the radio signal transmitter/receiver 11 and the antenna 7. The controller 8 supplies this transmitted mail data to the memory unit 12 to be stored in sequence as a mail transmission history. When the radio signal transmitter/receiver 11 receives an electronic mail, the controller 8 drives the display unit 6 to display the received message and supplies the same to the memory unit 12 to be stored as a mail reception history.

The memory unit 12 further stores therein a plurality of dictionaries for converting different languages, for instance, between Japanese and English and between Japanese and Chinese. In the case that the Japanese/English conversion dictionary is selected by the controller 8, the controller 8 converts Japanese words or short sentences (for instance, "i-ku-ra de-su-ka?") input by the user's key manipulation on the key unit 3 to corresponding English words or short sentences (for instance, "How much?") with reference to the Japanese/English dictionary stored in the memory unit 12. The resulting English words or short sentences are displayed on the display unit 6.

The memory unit further stores therein a plurality of voice data of national languages corresponding to the dictionary function. Thus, the converted words or short sentences (for instance, "How much?") are also produced invoice sound through the audio signal processor 9 and the speaker 5. On the other hand, the controller 8 converts English words or short sentences (for instance, "airplane") input by the user's key manipulation on the key unit 3 to corresponding Japanese words or short sentences (for instance, "hi-ko-u-ki") with reference to the Japanese/English dictionary. The resulting Japanese words or short sentences are displayed on the display unit 6 and produced in voice sound from the speaker 5.

The RTC 13 measures time and supplies the time data to the controller 8. The RTC 13 sets or corrects its time data when the controller 8 instructs time setting or correction in response to the user's manipulation of the keys on the key unit 3.

Figure 3:
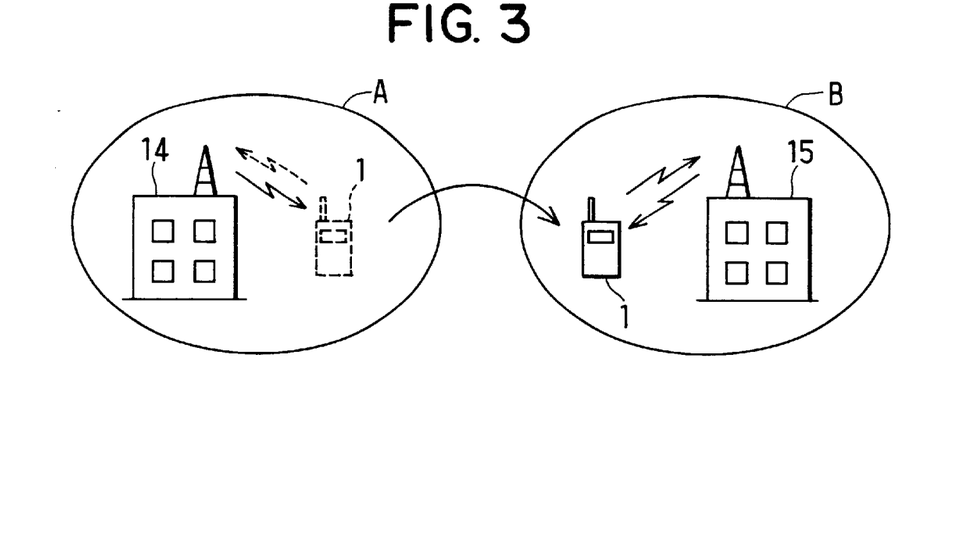
FIG. 3 is a schematic view showing a mode of communication between the cellular phone and a base station in a different country.

The cellular phone 1 is a type which operates in a predetermined communication protocol such as "cdmaOne" which is adopted in a plurality of countries and capable of the international roaming among those countries. For instance, as shown in FIG. 3, even if the cellular phone 1 is normally used in a communication service area A of a base station 14 in one country (for instance, Japan), it can be used in the same manner in a different service area B of a base station 15 in another country (for instance, the United States of America).

The cellular phone 1 may be programmed to operate as follows.
(First embodiment)

Figure 5:
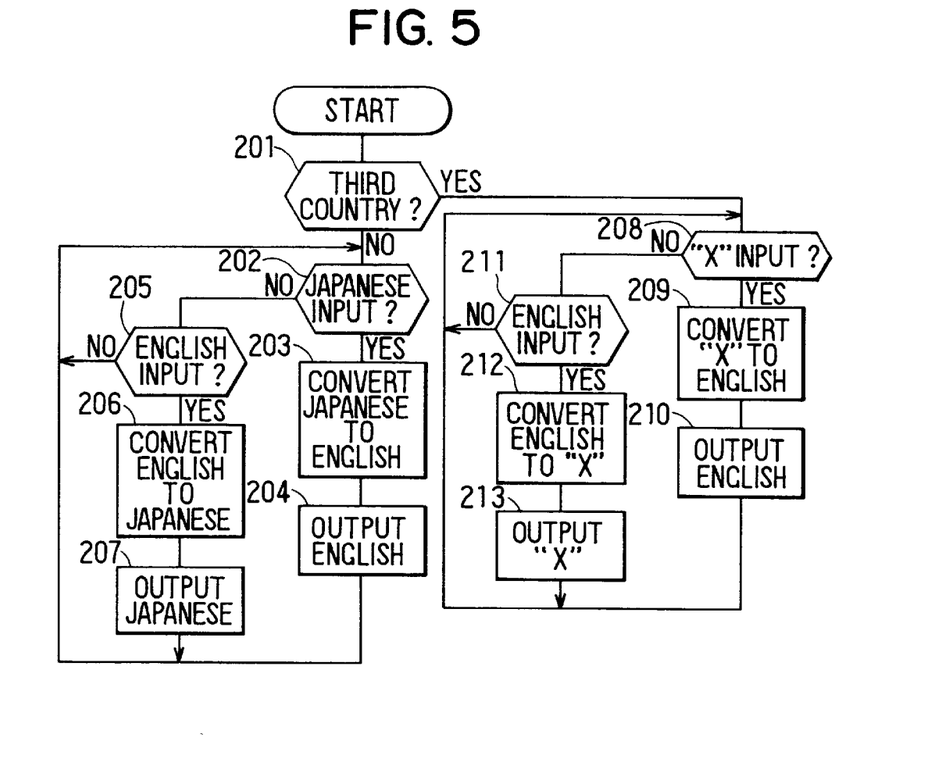
FIG. 5 is a flow diagram showing dictionary function processing executed in the first embodiment.
Figure 6:
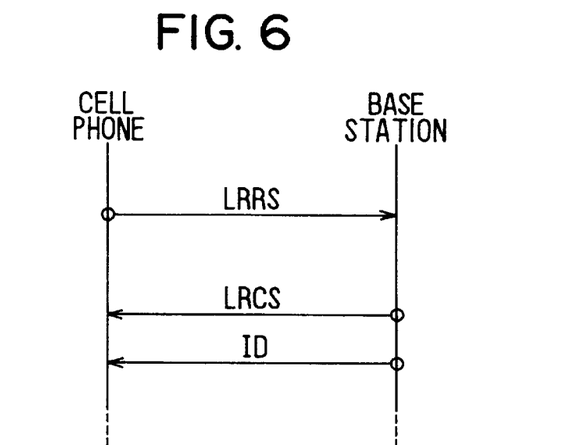
FIG. 6 is a schematic view showing a mode of international roaming executed in the first embodiment.

In a first embodiment, it is assumed that a user of the cellular phone 1 travels to and uses it in the United States of America, although he normally uses it in Japan. In this embodiment, the cellular phone 1, particularly its controller 8, is programmed to perform a dictionary selection function and a dictionary function as shown in FIGS. 4 to 6.

Figure 4:
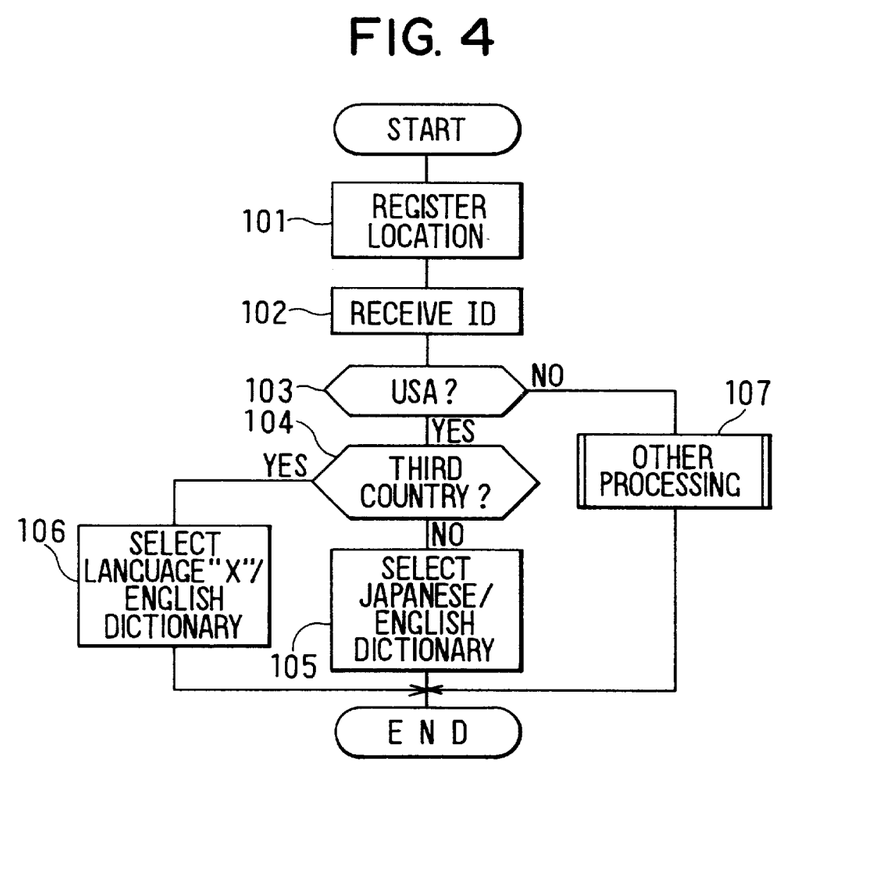
FIG. 4 is a flow diagram showing dictionary function selection processing executed in a first embodiment of the present invention.

As shown in FIG. 4, the cellular phone 1 first transmits a location registration request signal LRRS to the base station 15 to register its location of use at step 101. The base station 15 returns a location registration confirmation signal LRCS to the cellular phone 1 in response to the location registration request signal. In the radio communication system which performs the international roaming, the base station 15 also transmits a signal of identification (ID) code indicative of the county in which it is located. This signal transmission and reception operation is shown in FIG. 6.

The cellular phone 1 receives the ID code at step 102, and checks at step 103 whether the received ID code indicates the United States of America. If the check result is YES, the cellular phone 1 further checks at step 104 whether another county (third country) X is set. Here, the third country X means any country other than the user's home country (Japan) and the country of travel (USA). If the check result is NO, the cellular phone 1 selects the Japanese-to-English conversion dictionary at step 105, thus ending its dictionary selection function processing.

If the check result at step 104 is YES, for instance, Germany is set as the third country X), the cellular phone 1 selects the German-to-English conversion dictionary at step 106 thus completing the dictionary selection function processing. If the check result at step 103 is NO, the cellular phone 1 executes other processing at step 107 in accordance with the received ID code other than the United States of America. The other processing at step 107 is similar to steps 104 to 106.

The cellular phone 1 then executes a dictionary function processing shown in FIG. 5. This processing is initiated, when the user of the cellular phone 1 manipulates the key unit 3 and selects the dictionary function from a menu of function selection.

The cellular phone 1 first checks at step 201 whether the third country has been set (step 104). If the check result is NO, the cellular phone 1 is held in a wait condition in which a word or short sentence in Japanese or in English input by the user through the key unit 3.

The cellular phone 1 checks at step 202 whether a Japanese word or short sentence is input. If the check result is YES, the cellular phone 1 converts at step 203 the input Japanese to English with reference to the stored Japanese/English dictionary, and outputs the resulting English at step 204. The resulting English is displayed on the display unit 6 and produced in voice sound from the speaker 5.

If the check result at step 202 is NO, the cellular phone 1 checks at step 205 whether an English word or short sentence is input. If the check result is YES, the cellular phone 1 converts at step 206 the input English to Japanese with reference to the stored Japanese/English dictionary, and outputs the resulting Japanese at step 207. The resulting Japanese is displayed on the display unit 6 and produced in voice sound from the speaker 5. The above steps 202 to 207 are repeated for each input of the Japanese word or sentence.

If the check result at step 201 is YES indicating that the third country X is set, the cellular phone 1 executes steps 208 to 213 in the similar manner as steps 202 to 207. Steps 208 to 213 are differentiated from steps 202 to 207 only in that Japanese language is replaced with the third country language X (for instance, German).

As described above, the cellular phone 1 automatically changes its language conversion function operation to match the country where the user travels, upon its location registration and ID code reception such a country. Thus, as far as the conversion of languages between the home country and the travel country is concerned, the cellular phone 1 need not be manually manipulated to change its language conversion function operation each time the user enters different countries. Further, the cellular phone 1 is enabled to execute the conversion of languages between the third country and the travel country by manually setting the third country.

(Second Embodiment)

Figure 7:
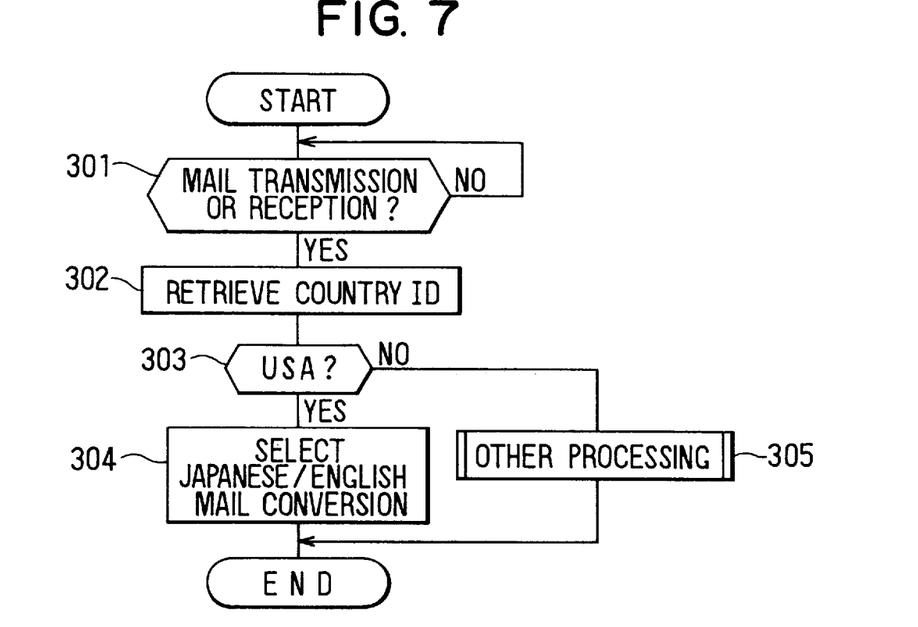
FIG. 7 is a flow diagram showing mail conversion function selection processing executed in a second embodiment of the present invention.
Figure 8:
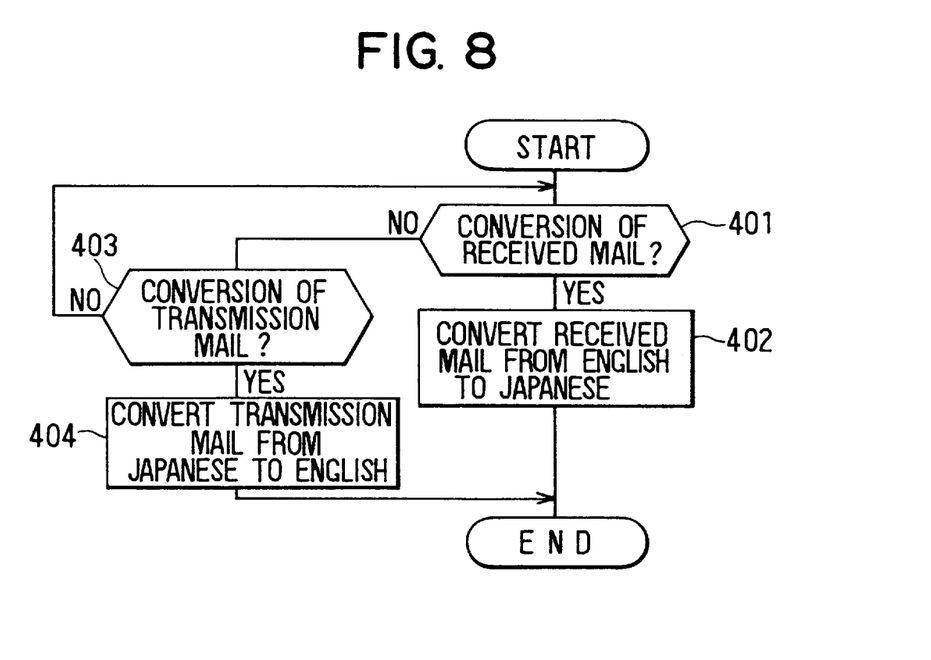
FIG. 8 is a flow diagram showing mail conversion function processing executed in the second embodiment.

In a second embodiment, the cellular phone 1 is programmed to perform an electronic mail conversion selection function and an electronic mail conversion function as shown in FIGS. 7 and 8.

The cellular phone 1 first checks at step 301 in FIG. 7 whether it has received or transmitted a mail. If the check result is YES, the cellular phone 11 retrieves a country ID code from a received or transmitted mail number at step 302. The cellular phone 1 then checks at step 303 whether the retrieved ID code indicates the United States of America. If the check result is YES, the cellular phone 1 selects at step 304 a Japanese/English mail conversion function thus ending the mail conversion function processing. If the check result at step 303 is NO, the cellular phone 1 executes other processing at step 305 in the similar manner as step 107 (FIG. 4) in the first embodiment. That is, at step 305, other mail message conversion selection is made in the similar manner as steps 303 and 304 with respect to other countries indicated by ID codes.

When the user of the cellular phone 1 manipulates the key unit to select the mail conversion function from the menu of function selection, the cellular phone 1 executes the mail conversion function processing shown in FIG. 8. Specifically, the cellular phone 1 checks at steps 401 and 403 whether it is manipulated to select either a received mail conversion function or a transmission mail function, respectively.

If the selected function is the received mail conversion (YES at step 401), the cellular phone 1 converts a received mail message from English to Japanese. It is to be noted that the country of origin of the received mail can be identified from the retrieved ID code, the cellular phone 1 can automatically determine that the conversion should be from English to Japanese. For instance, if the received mail message is "When shall we meet again?", the conversion result is "ko-n-do i-tsu a-i-ma-sho-u-ka". This converted message is displayed on the display unit 6.

If the selected function is the transmission mail conversion (YES at step 403), the cellular phone 1 converts a mail message input by the user from Japanese to English. For instance, if the input mail message is "A-shi-ta e-i-ga-wo mi-ni i-ko-u.", the converted message is "Let's go to a movie, tomorrow!". Thus, the transmission mail input in Japanese can be transmitted in English after automatic translation.

(Third Embodiment)

Figure 9:
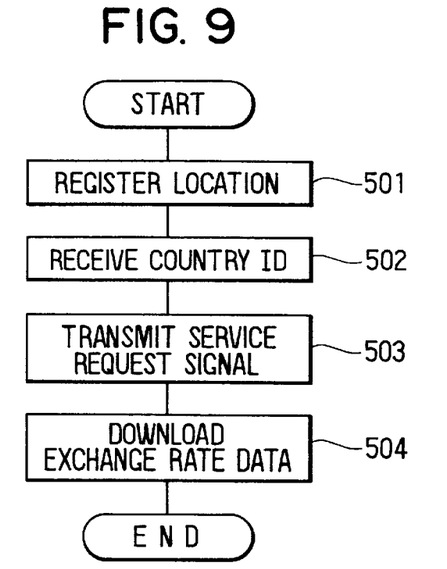
FIG. 9 is a flow diagram showing currency exchange rate data downloading processing executed in a third embodiment of the present invention.
Figure 10:
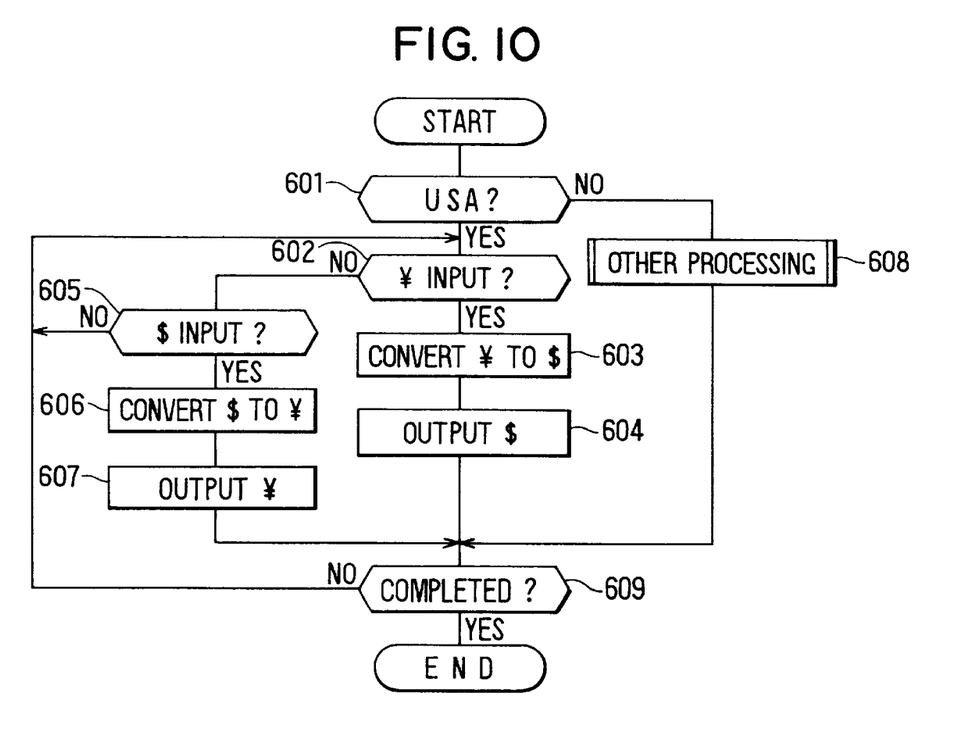
FIG. 10 is a flow diagram showing currency conversion function processing executed in the third embodiment.

In a third embodiment, the cellular phone 1 is programmed to perform a currency exchange rate downloading function and a currency exchange rate conversion function as shown in FIGS. 9 and 10. In this embodiment, the cellular phone 1 registers its location at step 501 and receives the country ID code at step 502 in the same manner as steps 101 and 102 (FIG. 4) of the first embodiment.

In response to the user's manipulation on the cellular phone 1 to select the currency exchange rate downloading function, the cellular phone 1 automatically dials and transmits at step 503 in FIG. 9 a request signal to a service provider which provides the currency exchange rate data. The phone number of the service provider may be stored in the cellular phone 1 in advance for automatic transmission of the request signal. The cellular phone 1 receives the exchange rate data through the base station 15 and downloads the received data in its memory unit 12 at step 504, thus ending the downloading function processing.

When the user manipulates the key unit 3 to select the currency exchange rate conversion function from the menu of function selection, the cellular phone 1 checks at step 601 whether the ID code received at step 502 indicates the United States of America. If the check result is YES, the cellular phone 1 checks at steps 602 and 605 whether Yen (Y) amount and Dollar ($) amount are input, respectively.

If the Yen amount is input (YES at step 602), the cellular phone converts at step 603 the input Yen amount to the corresponding Dollar amount with reference to the Yen/Dollar exchange rate downloaded in its memory unit 12. The cellular phone 1 displays the resulting Dollar amount on its display unit 6 at step 604. For instance, if the downloaded exchange rate is "$1=¥120", input amount "¥10,000" is converted to "$83.33".

If the Dollar amount is input (YES at step 605), the cellular phone converts at step 606 the input Dollar amount to the corresponding Yen amount with reference to the Yen/Dollar exchange rate downloaded in its memory unit 12. The cellular phone 1 displays the resulting Yen amount on its display unit 6 at step 607. For instance, if the downloaded exchange rate is "$1=¥120", input amount "$5,000" is converted to "¥600,000".

If the check result at step 601 is NO, the cellular phone 1 executes other processing at step 608 in which the similar conversion as ¥/$ conversion (steps 601 to 607) is performed with respect to other countries indicated by ID codes. The cellular phone 609 checks at step 609 whether the user manipulates the key unit 3 to end the currency exchange rate conversion function. If the check result is YES, the cellular phone 1 ends the exchange rate conversion function processing.

(Fourth Embodiment)

Figure 11:
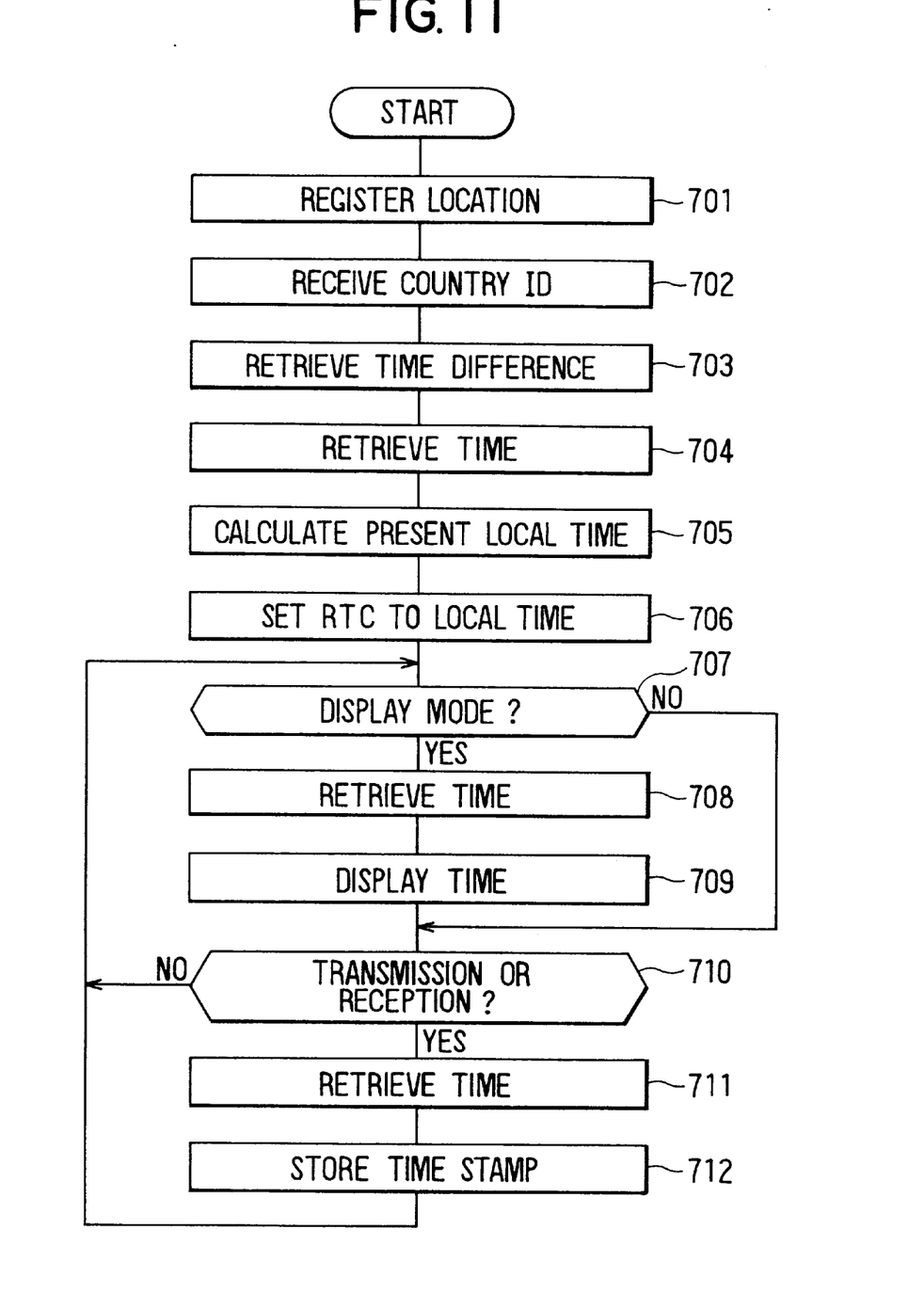
FIG. 11 is a flow diagram showing local time conversion function processing executed in a fourth embodiment.

In a fourth embodiment, the cellular phone 1 is programmed to perform a time conversion function as shown in FIG. 11. This function is for correcting time which the cellular phone 1 uses or displays to local time. The cellular phone 1 executes a position registration at step 701 and country ID code retrieval at step 702 in the similar manner as steps 101 and 102 (FIG. 4) of the first embodiment.

The cellular phone 1 then retrieves a difference of time between the home country (Japan) and the travel country (United States of America) at step 703. The cellular phone 1 sores in its memory unit 2 the time difference data of various countries relative to the home country in advance. For instance, it stores -14 hours if the cellular phone 1 is located in New York of the United States of America.

The cellular phone 1 retrieves at step 704 the time (time of the home country) measured by its real time clock (RTC) 13, and calculates at step 705 the present local time by adding the retrieved time difference to the retrieved time of the home country. The cellular phone 1 then adjusts the measured time of RTC 13 to the calculated local time at step 706, so that the RTC 13 continues to measure time based on the adjusted local time.

The cellular phone 1 then checks at step 707 whether it is set to a mode to display the local time on its display unit 6. If the check result is YES, the cellular phone 1 reads out the present local time from the RTC 13 at step 708 and displays the local time on its display unit 6 at step 709. If the check result at step 707 is NO, the cellular phone 1 does not execute steps 708 and 709.

The cellular phone 1 further checks at step 710 whether any call is transmitted or received. If the check result is YES, the cellular phone 1 retrieves the local time from the RTC 13 at step 711, and stores the local time in the memory unit 12 as the time stamp of the transmission log or the reception log at step 712. The cellular phone 1 repeats the above steps from step 707, if the check result at step 710 is NO or the step 712 is completed.

The present invention should not be limited to the above embodiments, but may be modified or implemented in many other ways. For instance, the cellular phone 1 may be programmed to perform not only one combination of selection-conversion function but also some or all of the above combinations.

Further, the function of setting the third country in the first embodiment and the like can be made optional. In the first and second embodiments, fixed-type sentences or past mail messages in Japanese stored in the memory unit 12 in advance may be used to convert into English so that the user of the cellular phone 1 need not input sentences or messages anew. In the second embodiment, the mail conversion function may be limited to only one of the received mail and the transmission mail, and the mail conversion function processing may be initiated automatically upon reception of a mail.

What is claimed is:

1. A cellular phone for a radio communication system which enables communication through base stations of a plurality of countries, the cellular phone comprising:

ID code retrieval means for retrieving a country identification code from a base station of a country in which a phone user is located;

data conversion means for converting input data to output data with reference to conversion data which define relations of the data among a plurality of countries;

change means for automatically changing, in response to the retrieved country identification code, a conversion operation of the data conversion means in response to the retrieved country identification code;

first memory means for storing therein time differences among the plurality of countries as the conversion data, wherein the change means selects one of the time differences for use in the conversion operation of the data conversion means in response to the retrieved country identification code, so that the conversion operation is effected between time of a home country of the phone user and time of the country indicated by the retrieved country identification code.

2. The cellular phone s in claim 1, further comprising:

second memory means for storing therein a plurality of language dictionaries as the conversion data, wherein the change means selects one of the language dictionaries for use in the conversion operation of the data conversion means in response to the retrieved country identification code, so that the conversion operation is effected between a language of the home country of the phone user and a language of the country indicated by the retrieved country identification code.

3. The cellular phone as in claim 2, wherein:

the ID code retrieval means retrieves the country identification code from an electronic mail which is transmitted or received through the base station of the country in which the phone user is located.

4. The cellular phone as in claim 1, further comprising:

exchange rate retrieval means for retrieving a plurality of currency exchange rate data from the base station of the country in which the phone user is located, wherein the change means selects one of the exchange rate data for use in the conversion operation of the data conversion means in response to the retrieved country identification code so that the conversion operation is effected between a currency of the home country of the phone user and the country indicated by the retrieved country identification code.

* * * * *